United States Patent

Nakane et al.

[11] Patent Number: 5,979,529
[45] Date of Patent: Nov. 9, 1999

[54] ADHERENT RUBBER COMPOSITION FOR STEEL CORD

[75] Inventors: Shinsuke Nakane; Kanji Fujiki, both of Kodaira, Japan

[73] Assignee: Bridgestone Corporation, Tokyo, Japan

[21] Appl. No.: 09/182,880

[22] Filed: Oct. 30, 1998

Related U.S. Application Data

[62] Division of application No. 08/719,075, Sep. 24, 1996, abandoned.

[30] Foreign Application Priority Data

Sep. 29, 1995 [JP] Japan ................................ 7-253011
Dec. 8, 1995 [JP] Japan ................................ 7-320486

[51] Int. Cl.$^6$ ........................ C08K 3/38; C08K 3/34; C08K 3/32; C08K 3/26; B60C 9/00
[52] U.S. Cl. .................... 152/564; 152/565; 524/405; 524/413; 524/417; 524/421; 524/423; 524/424; 524/434; 524/435
[58] Field of Search .................... 524/405, 413, 524/417, 420, 423, 435, 436, 492, 925, 928, 424, 426, 434, 403, 421; 152/564, 565; 156/334, 333, 338

[56] References Cited

U.S. PATENT DOCUMENTS

| | | |
|---|---|---|
| Re. 30,193 | 1/1980 | O'Shaughnessy . |
| 2,080,730 | 5/1937 | McCortney . |
| 2,115,053 | 4/1938 | Winkelmann . |
| 2,328,351 | 8/1943 | McDonald . |
| 2,331,323 | 10/1943 | Jahant . |
| 2,366,895 | 1/1945 | Griffith . |
| 2,386,213 | 10/1945 | Griffith . |
| 2,435,191 | 2/1948 | Adler . |
| 2,507,142 | 5/1950 | Chaban . |
| 2,563,772 | 8/1951 | Cheney . |
| 2,643,273 | 6/1953 | Wilkins . |
| 3,535,249 | 10/1970 | Larson . |
| 3,867,315 | 2/1975 | Tiegner et al. . |
| 3,897,387 | 7/1975 | O'Shaughnessy . |
| 3,951,894 | 4/1976 | Whelan . |
| 3,976,624 | 8/1976 | Inouye et al. . |
| 4,031,302 | 6/1977 | Schmizu et al. . |
| 4,057,529 | 11/1977 | Leo et al. . |
| 4,174,993 | 11/1979 | Fujii et al. . |
| 4,182,803 | 1/1980 | Kanagawa et al. . |
| 4,228,045 | 10/1980 | Bezwarda . |
| 4,258,770 | 3/1981 | Davis . |
| 4,269,740 | 5/1981 | Woods et al. . |
| 4,551,391 | 11/1985 | Kang . |
| 4,569,382 | 2/1986 | Maxey et al. . |
| 5,583,172 | 12/1996 | Imahashi et al. . |

FOREIGN PATENT DOCUMENTS

| | | |
|---|---|---|
| 0065476 | 11/1982 | European Pat. Off. . |
| 0149731 | 7/1985 | European Pat. Off. . |
| 0208505 | 1/1987 | European Pat. Off. . |

*Primary Examiner*—Veronica P. Hoke
*Attorney, Agent, or Firm*—Sughrue, Mion, Zinn, Macpeak & Seas, PLLC

[57] ABSTRACT

An adherent rubber composition suitable for use in the adhesion to steel cords comprises given amounts of an inorganic salt hydrate and sulfur based on 100 parts by weight of rubber ingredient comprising not less than 10% by weight of at least one synthetic rubber and the remainder being natural rubber.

13 Claims, No Drawings

ADHERENT RUBBER COMPOSITION FOR STEEL CORD

This is a divisional of application Ser. No. 08/719,075 filed Sep. 24, 1996 now abandoned, the disclosure of which is incorporated herein by reference.

BACKGROUND OF THE INVENTION

Field of the Invention

This invention relates to an adherent rubber composition, and more particularly to an adherent rubber composition suitable for the adhesion to brass plated steel cords.

Description of Related Art

Heretofore, steel cords have been used as a reinforcing member in order to improve performances of rubber articles such as automobile tires, conveyor belts and the like.

In general, the steel cord is subjected to a brass plating in order to enhance the reinforcing effect or an adhesiveness to rubber.

In the adhesion of rubber to the brass plated steel cord through vulcanization, it is necessary that an unvulcanized rubber contains a certain amount of water in order to sufficiently ensure an adhesiveness just after the vulcanization. In a dry winter season, however, the water content in the unvulcanized rubber lowers and hence the adhesiveness may be deficient.

Thus, the adhesiveness just after the vulcanization becomes particularly unstable in the winter season, so that it is desired to stably ensure the adhesiveness between rubber and steel cord even in the winter season.

In order to ensure a given water content in the unvulcanized rubber at the dry winter season, there is proposed a method wherein water is merely added to the unvulcanized rubber or water is adsorbed on carbon black or rubber chemicals in the unvulcanized rubber composition. However, this method is not effective because a rotor in a kneader for the rubber composition slips or water is evaporated during the kneading. Furthermore, there is proposed a method of leaving the unvulcanized rubber in a humidity controller to adjust the water content, which has a drawback that a long leaving time is taken for the adjustment of the water content.

On the other hand, when the rubber composition for use in the adhesion to steel cord mainly contains natural rubber as a rubber ingredient, the adhesion property to steel cord is excellent, but the thermal aging resistance may become poor. In order to improve the thermal aging resistance, it is enough to use a synthetic rubber having less carbon-carbon double bond (>C=C<) in its main chain, but there is a problem that the adhesion property is inversely lowered.

SUMMARY OF THE INVENTION

It is, therefore, an object of the invention to provide an adherent rubber composition capable of stably providing the adhesiveness just after the vulcanization irrespectively of season to form a rubber-steel cord composite body having excellent adhesiveness or further thermal aging resistance.

The inventors have made various studies in order to achieve the above object and found that in order to simply and surely raise the water content of the rubber composition, it is effective to use an inorganic salt hydrate as a compound capable of releasing water during kneading or vulcanization together with a synthetic rubber having a low water content, if necessary, in addition to the compounding with natural rubber having a high water content and as a result the invention has been accomplished.

According to the invention, there is the provision of an adherent rubber composition for steel cord comprising 0.1–10 parts by weight of an inorganic salt hydrate and 3–8 parts by weight of sulfur based on 100 parts by weight of rubber ingredient comprised of at least one rubber selected from natural rubber and synthetic rubbers.

In a preferable embodiment of the invention, the rubber ingredient contains at least 50% by weight of natural rubber.

In another preferable embodiment of the invention, the synthetic rubber is selected from the group consisting of styrene-butadiene rubber (SBR), butadiene rubber (BR), butyl rubber (IIR), halogenated butyl rubber (halogenated IIR), butyl rubber having paramethylstyrene group therein, isoprene rubber (IR) and ethylene-propylene-diene rubber (EPDM).

In the other preferable embodiment of the invention, the amount of the inorganic salt hydrate is 0.2–8 parts by weight, more particularly 0.3–3 parts by weight.

In a further preferable embodiment of the invention, the rubber composition further contains 2–10 parts by weight of zinc white, 0.3–2 parts by weight of a vulcanization accelerator, 0.25–3 parts by weight of an adhesion promoter and 30–70 parts by weight of carbon black based on 100 parts by weight of the rubber ingredient.

In a still further preferable embodiment of the invention, the styrene-butadiene rubber is a solution-polymerized styrene-butadiene rubber having a vinyl content of 35–85% by weight and a bound styrene content of not more than 30% by weight, and the butadiene rubber has a vinyl content of 1–85% by weight.

DESCRIPTION OF THE PREFERRED EMBODIMENTS

The invention will be described in detail below.

As the inorganic salt hydrate used in the invention, mention may be made of $NiSO_4 \cdot 7H_2O$, $CoSO_4 \cdot 7H_2O$, $NaSO_4 \cdot 10H_2O$, $CaSO_4 \cdot 2H_2O$, $CuSO_4 \cdot 5H_2O$, $FeSO_4 7H_2O$, $ZnSO_4 7H_2O$, $Na_2S \cdot 9H_2O$, $Na_3PO_4 \cdot 12H_2O$, $NaH_2PO_4 \cdot 12H_2O$, $Ni_3(PO_4)_2 \cdot H_2O$, $Ni_3(PO_4)_2 \cdot 8H_2O$, $Mg_3(PO_4)_2 8H_2O$, $Li_3PO_4 \cdot 5H_2O$, $Na_4P_2O_7 \cdot 10H_2O$, $Ni_2P_2O_7 \cdot 6H_2O$, $Mn_4(P_2O_7)_3 \cdot 14H_2O$, $CoCO_3 \cdot 6H_2O$, $NiCO_3 \cdot 6H_2O$, $Na_2CO_3 10H_2O$, $Nd_2(CO_3)_3 \cdot 8H_2O$, $Na_2SO_3 \cdot 7H_2O$, $CaCl_2 \cdot 6H_2O$, $NiCl_2 \cdot 6H_2O$, $Na_2B_4O_7 10H_2O$, $FeCl_3 \cdot Na_2SiO_3 \cdot 9H_2O$ and the like.

For example, when the rubber composition contains $Na_2P_2O_5 \cdot 10H_2O$ as the inorganic salt hydrate, $H_2O$ is released from the inorganic salt hydrate during the vulcanization after the rubber composition is applied onto brass plated steel cords, and hence zinc is diffused from the surface of the brass plated layer into rubber by the released water to facilitate the reaction between copper in the brass plated layer and sulfur in the rubber composition, whereby the formation of cuprous sulfide is promoted at an early time to stabilize the adhesiveness after the vulcanization.

The inorganic salt hydrate is compounded in an amount of 0.1–10 parts by weight based on 100 parts by weight of the rubber ingredient. When the amount of the inorganic salt hydrate is less than 0.1 part by weight, the effect of improving the adhesion property is not obtained, while when it exceeds 10 parts by weight, the water content in the rubber composition becomes too high and the adhesion property and fracture properties are undesirably degraded. The amount of the inorganic salt hydrate is preferably 0.2–8 parts by weight, more particularly 0.3–3 parts by weight for obtaining good and stable adhesiveness.

In the rubber composition according to the invention, the rubber ingredient contains at least 50% by weight of natural rubber. As the synthetic rubber, use may be made of SBR, BR, IIR, halogenated IIR, IIR having paramethylstyrene group therein (concretely copolymer of isobutyrene and p-halogenated methylstyrene or the like), IR and EPDM. When the amount of natural rubber is less than 50% by weight, the adhesiveness to steel cord and the fracture properties of rubber are undesirably degraded. Moreover, when the rubber ingredient is a blend of natural rubber and at least one synthetic rubber, if the amount of the synthetic rubber is less than 10% by weight, the thermal aging resistance is undesirably degraded together with the degradation of adhesiveness and fracture properties.

Among the synthetic rubbers, it is favorable to use at least one rubber selected from a solution-polymerized SBR having a vinyl content of 35–85% by weight and a bound styrene content of not more than 30% by weight, and a butadiene rubber having a vinyl content of 1–85% by weight. In the solution-polymerized SBR, when the vinyl content is less than 35% by weight, the thermal aging resistance can not be improved, while when it exceeds 85% by weight, the fracture properties are degraded, and when the bound styrene content exceeds 30% by weight, the adhesion lowers. In the butadiene rubber, when the vinyl content is outside the above range, the merit of improving the thermal aging resistance is lost and also the fracture properties are degraded.

Furthermore, sulfur is compounded in an amount of 3–8 parts by weight based on 100 parts by weight of the rubber ingredient. When the amount of sulfur is less than 3 parts by weight, it is difficult to ensure the original adhesiveness between brass and sulfur after the vulcanization, while when it exceeds 8 parts by weight, the thermal aging resistance and heat-resistant adhesion are undesirably lowered.

Moreover, the rubber composition according to the invention may be compounded with proper amounts of additives usually used in rubber industry. For example, zinc white is compounded in an amount of 2–10 parts by weight based on 100 parts by weight of the rubber ingredient. When the amount of zinc white is less than 2 parts by weight, the sufficient modulus of elasticity is not obtained, while when it exceeds 10 parts by weight, the adhesion lowers. Further, the vulcanization accelerator is compounded in an amount of 0.3–2 parts by weight. When the amount of the vulcanization accelerator is less than 0.3 part by weight, the sufficient modulus of elasticity is not obtained, while when it exceeds 2 parts by weight, the adhesion lowers. Further, the adhesion promoter is compounded in an amount of 0.25–3 parts by weight. When the amount of the adhesion promoter is less than 0.25 part by weight, the addition effect is not developed, while when it exceeds 3 parts by weight, the resistance to thermal aging lowers. And also, carbon black is compounded in an amount of 30–70 parts by weight. When the amount of carbon black is less than 30 parts by weight, the sufficient modulus of elasticity is not obtained, while when it exceeds 70 parts by weight, the fracture properties are degraded. Moreover, the other additives may be compounded, if necessary.

In the brass plating of the steel cord, it is preferable that the Cu content is not more than 75% by weight, more particularly 55–70% by weight in order to obtain a good and stable adhesion between steel cord and rubber.

The following examples are given in illustration of the invention and are not intended as limitations thereof.

Examples 1–13, Comparative Examples 1–5

Various rubber compositions are prepared by a usual manner according to a compounding recipe shown in Table 1, and then the water content in unvulcanized rubber and adhesiveness and the thermal aging resistance of rubber after vulcanization are measured by the following methods to obtain results as shown in Table 1.

On the other hand, natural rubber, synthetic rubber, carbon black, ZnO, antioxidant and sulfur are dried under vacuum before the compounding and then compounded with the inorganic salt hydrate according to the compounding recipe of Table 1 to prepare a rubber composition. The properties of the rubber composition are measured in the same manner to obtain results as shown in Table 1.

(1) Measurement of water content

The amount of water discharged when 1.0 g of the unvulcanized rubber is heated to 200° C. is measured by Karl Fischer titration method.

(2) Measurement of adhesiveness

Brass plated steel cords (1×5 twisting structure, filament diameter: 0.25 mm, Cu: Zn in brass plating=63:37) are arranged side by side at an interval of 12.5 mm and embedded in the rubber composition for coating to form a test sample. This sample is cured at 160° C. for 20 minutes and then the steel cord is pulled out from the cured sample according to ASTM D-2229 to measure a pulling force for the evaluation of the adhesiveness.

The adhesiveness is represented by an index on the basis that Comparative Example 1 is 100. The larger the index value, the better the adhesiveness.

(3) Measurement of thermal aging resistance

The rubber composition is vulcanized at 160° C. for 20 minutes to form a vulcanized sample, which is aged at 100° C. for 48 hours. Then, the aged sample is subjected to a tensile test according to JIS K-6301 to measure an elongation at breakage. The thermal aging resistance is represented by an index on the basis that the elongation value of Comparative Example 1 is 100. The larger the index value, the better the thermal aging resistance.

TABLE 1

(unit: part by weight)

| | Comparative Example 1 | Example 1 | Example 2 | Example 3 | Example 4 | Example 5 | Example 6 | Example 7 | Example 8 |
|---|---|---|---|---|---|---|---|---|---|
| Natural rubber | 100 | 100 | 100 | 80 | 50 | 90 | 90 | 100 | 100 |
| Isoprene rubber | | | | 20 | 50 | | | | |
| Butadiene rubber | | | | | | 10 | | | |
| Styrene-butadiene rubber | | | | | | | 10 | | |
| Carbon black HAF | 50 | 50 | 50 | 50 | 50 | 50 | 50 | 50 | 50 |
| ZnO | 5 | 5 | 5 | 5 | 5 | 5 | 5 | 5 | 5 |
| Vulcanization accelerator DZ*[1] | 1 | 1 | 1 | 1 | 1 | 1 | 1 | 1 | 1 |
| Antioxidant 6C*[2] | 2 | 2 | 2 | 2 | 2 | 2 | 2 | 2 | 2 |
| Sulfur | 5 | 5 | 5 | 5 | 5 | 5 | 5 | 5 | 5 |
| Cobalt naphthenate | 1 | 1 | 1 | 1 | 1 | 1 | 1 | 1 | 1 |
| $Na_2CO_3 \cdot 10H_2O$ | | 1 | | | | | | | |
| $Na_4P_2O_7 \cdot 10H_2O$ | | | 1 | 1 | 1 | 1 | 1 | | |
| $Na_2SiO_3 \cdot 9H_2O$ | | | | | | | | 1 | |
| $Na_2B_4O_7 \cdot 10H_2O$ | | | | | | | | | 1 |
| Kneading in usual manner | | | | | | | | | |
| Water content in unvulcanized rubber (wt %) | 0.63 | 0.81 | 0.85 | 0.82 | 0.75 | 0.81 | 0.80 | 0.84 | 0.79 |
| Adhesiveness (index) | 100 | 105 | 110 | 108 | 103 | 106 | 105 | 110 | 103 |
| Thermal aging resistance (index) | 100 | 100 | 102 | 101 | 101 | 107 | 107 | 100 | 98 |
| Kneading after vacuum drying | | | | | | | | | |
| Water content in unvulcanized rubber (wt %) | 0.41 | 0.62 | 0.63 | 0.60 | 0.55 | 0.60 | 0.59 | 0.61 | 0.59 |
| Adhesiveness (index) | 60 | 100 | 100 | 100 | 96 | 100 | 99 | 100 | 99 |

(unit: part by weight)

| | Comparative Example 2 | Example 9 | Example 10 | Example 11 | Comparative Example 3 | Comparative Example 4 | Example 12 | Example 13 | Comparative Example 5 |
|---|---|---|---|---|---|---|---|---|---|
| Natural rubber | 100 | 100 | 100 | 100 | 100 | 100 | 100 | 100 | 100 |
| Isoprene rubber | | | | | | | | | |
| Butadiene rubber | | | | | | | | | |
| Styrene-butadiene rubber | | | | | | | | | |
| Carbon black HAF | 50 | 50 | 50 | 50 | 50 | 50 | 50 | 50 | 50 |
| ZnO | 5 | 5 | 5 | 5 | 5 | 5 | 5 | 5 | 5 |
| Vulcanization accelerator DZ *[1] | i | 1 | 1 | 1 | 1 | 1 | 1 | 1 | 1 |
| Antioxidant 6C*[2] | 2 | 2 | 2 | 2 | 2 | 2 | 2 | 2 | 2 |
| Sulfur | 5 | 5 | 5 | 5 | 5 | 2 | 4 | 7 | 10 |
| Cobalt naphthenate | 1 | 1 | 1 | 1 | 1 | 1 | 1 | 1 | 1 |
| $Na_2CO_3 \cdot 10H_2O$ | | | | | | | | | |
| $Na_4P_2O_7 \cdot 10H_2O$ | 0.05 | 0.3 | 2.5 | 8 | 15 | 1 | 1 | 1 | 1 |
| $Na_2SiO_3 \cdot 9H_2O$ | | | | | | | | | |
| $Na_2B_4O_7 \cdot 10H_2O$ | | | | | | | | | |
| Kneading in usual manner | | | | | | | | | |
| Water content in unvulcanized rubber (wt %) | 0.65 | 0.74 | 0.90 | 1.19 | 1.70 | 0.80 | 0.84 | 0.83 | 0.85 |
| Adhesiveness (index) | 100 | 103 | 115 | 125 | 80 | 30 | 107 | 115 | 85 |
| Thermal aging resistance (index) | 100 | 100 | 101 | 100 | 98 | 120 | 107 | 90 | 70 |
| Kneading after vacuum drying | | | | | | | | | |
| Water content in unvulcanized rubber (wt %) | 0.43 | 0.55 | 0.76 | 0.90 | 1.50 | 0.60 | 0.62 | 0.62 | 0.63 |
| Adhesiveness (index) | 70 | 99 | 105 | 115 | 80 | 10 | 99 | 108 | 90 |

Note)
*[1] N,N'-dicyclohexyl-2-benzothiazolyl sulfenamide (made by Ohuchi Shinko Kagaku Kogyo Co., Ltd. trade name: Noccler DZ)
*[2] N-(1,3-dimethyl-butyl)-N'-phenyl-p-phenylene diamine (made by Ohuchi Shinko Kagaku Kogyo Co., Ltd. trade name: Nocrac 6C)

As seen from Table 1, even when the starting materials are used at dry state, the lowering of water content in the unvulcanized rubber is controlled by incorporating the inorganic salt hydrate according to the invention into the rubber composition, whereby the stable adhesiveness can be obtained while avoiding the lowering of the adhesiveness.

Examples 14–20, Comparative Examples 6–9

Various rubber compositions are prepared by a usual manner according to a compounding recipe shown in Table 2, and then the adhesiveness and thermal aging resistance are measured by the same methods as in Example 1 to obtain results as shown in Table 2.

The adhesiveness is represented by an index on the basis that Comparative Example 6 is 100. The larger the index value, the better the adhesiveness. The thermal aging resistance is represented by an index on the basis that the elongation value of Comparative Example 6 is 100. The larger the index value, the better the thermal aging resistance.

TABLE 2

|  | Comparative Example | | | | Example | | | | | | |
| --- | --- | --- | --- | --- | --- | --- | --- | --- | --- | --- | --- |
|  | 6 | 7 | 8 | 9 | 14 | 15 | 16 | 17 | 18 | 19 | 20 |
| Natural rubber | 100 | 60 | 60 | 60 | 60 | 60 | 60 | 60 | 60 | 60 | 60 |
| Hi-vinyl BR *3 |  | 40 |  |  | 40 |  |  |  |  |  |  |
| Hi-vinyl SBR *4 |  |  | 40 | 40 |  | 40 | 40 | 40 | 40 | 40 |  |
| Brominated butyl rubber *5 |  |  |  |  |  |  |  |  |  |  | 40 |
| Zinc white | 7 | 7 | 7 | 7 | 7 | 7 | 7 | 7 | 7 | 7 | 7 |
| Vulcanization accelerator DZ *1 | 1 | 1 | 1 | 1 | 1 | 1 | 1 | 1 | 1 | 1 | 1 |
| Antioxidant 6C *2 | I | 1 | 1 | 1 | 1 | 1 | 1 | 1 | 1 | 1 | 1 |
| Carbon black LS-HAF | 50 | 50 | 50 | 50 | 50 | 50 | 50 | 50 | 50 | 50 | 50 |
| Sulfur | 5 | 5 | 5 | 5 | 5 | 5 | 5 | 5 | 5 | 5 | 5 |
| $Na_4P_2O_7 \cdot 10H_2O$ |  |  |  | 12 | 1 | 0.4 | 1 | 3 | 6 | 8 | 1 |
| Adhesion accelerator C22.5 *6 | 0.7 | 0.7 | 0.7 | 0.7 | 0.7 | 0.7 | 0.7 | 0.7 | 0.7 | 0.7 | 0.7 |
| Adhesiveness (index) | 100 | 90 | 90 | 80 | 100 | 105 | 110 | 120 | 120 | 120 | 100 |
| Thermal aging resistance (index) | 100 | 120 | 110 | 110 | 120 | 110 | 110 | 110 | 110 | 110 | 120 |

Note)
*1, *2 same as Table 1
*3 made by Bayer, trade name: V1 1979 (vinyl content: 80%)
*4 made by Japan Synthetic Rubber Co., Ltd. trade name: SL 574 (high-vinyl solution-polymerized SBR)
*5 made by Japan Synthetic Rubber Co., Ltd. trade name: BR2255
*6 adhesion accelerator, made by Rhone-Poulenc Viscosuisse SA As seen from Table 2, Comparative Example 7 is a case of mixing high-vinyl content polybutadiene with natural rubber, in which the thermal aging resistance is improved but the adhesion property is degraded as compared with the case of using only natural rubber.

Comparative Example 8 is a case of mixing natural rubber with solution-polymerized SBR as a synthetic rubber. In this case, the thermal aging resistance is improved but the adhesion property is degraded as compared with the case of using only natural rubber.

When Example 14 is compared with Comparative Example 7, the adhesion property is improved without damaging the thermal aging resistance owing to the presence of 1 part by weight of the inorganic salt hydrate.

It is apparent from Tables 1 and 2 that the amount of the inorganic salt hydrate added is required to be within a range defined in the invention.

As mentioned above, according to the invention, the water content in the unvulcanized rubber can be raised by adding the inorganic salt hydrate to the rubber composition, whereby the control of the water content becomes easy even in the dry winter season or the drying area and hence there can be developed an effect of obtaining the stable adhesiveness to steel cords. Furthermore, the thermal aging resistance can be improved by using natural rubber together with particular synthetic rubber as the rubber ingredient. Therefore, when the steel cord-rubber composite treated with the rubber composition according to the invention is applied to a tire structural member, there can be obtained an effect of controlling the occurrence of separation failure at cord end or improving the poor adhesiveness.

What is claimed is:

1. An article comprising a steel cord and a vulcanized rubber composition adhered to said steel cord; said rubber composition comprising 0.1–10 parts by weight of an inorganic salt hydrate selected from the group consisting of $Na_2S \cdot 9H_2O$, $Na_3PO_4 \cdot 12H_2O$, $NaH_2PO_4 \cdot 12H_2O$, $Na_2HPO_4 \cdot 12H_2O$, $Ni_3(PO_4)_2 \cdot 8H_2O$, $Mg_3(PO_4)_2 \cdot 8H_2O$, $Li_3PO_4 5H_2O$, $Na_4P_2O_7 \cdot 10H_2O$, $Ni_2P_2O_7 \cdot 6H_2O$, $Mn_4(P_2O_7)_3 \cdot 14H_2O$, $CoCO_3 \cdot 6H_2O$, $NiCO_3 \cdot 6H_2O$, $Na_2CO_3 10H_2O$, $Nd_2(CO_3)_3 \cdot 8H_2O$, and $Na_2SiO_3 \cdot 9H_2O$, and 3–8 parts by weight of sulfur based on 100 parts by weight of rubber ingredient comprising at least one rubber selected from the group consisting of natural rubber and synthetic rubber.

2. The article according to claim 1, wherein the rubber ingredient contains at least 50% by weight of natural rubber.

3. The article according to claim 1, wherein the synthetic rubber is selected from the group consisting of styrene-butadiene rubber, butadiene rubber, butyl rubber, halogenated butyl rubber, butyl rubber having a paramethylstyrene group therein, isoprene rubber and ethylene-propylene-diene rubber.

4. The article according to claim 1, wherein the rubber composition further contains 2–10 parts by weight of zinc white, 0.3–2 parts by weight of a vulcanization accelerator, 0.25–3 parts by weight of an adhesion promoter and 30–70 parts by weight of carbon black based on 100 parts by weight of the rubber ingredient.

5. The article according to claim 4, wherein the styrene-butadiene rubber is a solution-polymerized styrene-butadiene rubber having a vinyl content of 35–85% by weight and a bound styrene content of not more than 30% by weight, and the butadiene rubber has a vinyl content of 1–85% by weight.

6. The article according to claim 1, wherein the amount of the inorganic salt hydrate is 0.2–8 parts by weight.

7. The article according to claim 1, wherein the amount of the inorganic salt hydrate is 0.3–3 parts of weight.

8. The article according to claim 1, wherein the inorganic salt hydrate is $Na_4P_2O_7 \cdot 10H_2O$ or $Na_2SiO_3 \cdot 9H_2O$.

9. The article according to claim 1, wherein the steel cord is brass plated.

10. The article according to claim 1, wherein the Cu content of the brass plating is not more than 75% by weight.

11. The article according to claim 10, wherein the Cu content of the brass plating is not more than 55–70% by weight.

12. The article according to claim 1, wherein the article is a tire or a conveyer belt.

13. The article according to claim 1, wherein the article is a tire.

* * * * *